United States Patent
Schoenleitner et al.

(10) Patent No.: US 8,809,416 B2
(45) Date of Patent: Aug. 19, 2014

(54) WATERBORNE COATING COMPOSITION COMPRISING A POLYESTER AND A METAL SALT OF A FATTY ACID

(75) Inventors: Ernst Schoenleitner, Purkersdorf (AT); Berry Schoenaker, Didam (NL); Danny Elwood Smith, Aurora, IL (US)

(73) Assignee: Akzo Nobel Coatings International B.V., Arnhem (NL)

(*) Notice: Subject to any disclaimer, the term of this patent is extended or adjusted under 35 U.S.C. 154(b) by 0 days.

(21) Appl. No.: 13/375,539

(22) PCT Filed: May 27, 2010

(86) PCT No.: PCT/EP2010/057285
§ 371 (c)(1),
(2), (4) Date: Dec. 1, 2011

(87) PCT Pub. No.: WO2010/139586
PCT Pub. Date: Dec. 9, 2010

(65) Prior Publication Data
US 2012/0095146 A1    Apr. 19, 2012

Related U.S. Application Data

(60) Provisional application No. 61/183,295, filed on Jun. 2, 2009.

(30) Foreign Application Priority Data

Jun. 29, 2009   (EP) .................................... 09163965

(51) Int. Cl.
C09D 167/00 (2006.01)
C09D 167/08 (2006.01)
D21H 19/62 (2006.01)
D21H 19/40 (2006.01)
D21H 19/42 (2006.01)

(52) U.S. Cl.
USPC ........... 523/101; 524/398; 524/399; 524/400; 524/445

(58) Field of Classification Search
CPC ............................... D21H 19/40; D21H 19/62
USPC ........... 427/154–157; 523/100, 101; 524/400, 524/444–451; 428/480, 481; 521/48
See application file for complete search history.

(56) References Cited

U.S. PATENT DOCUMENTS 3,236,677 A    2/1966    Bradstreet
4,659,489 A *  4/1987    Hill et al. ...................... 508/503
(Continued)

FOREIGN PATENT DOCUMENTS

EP    0 960 021 B1    12/1999
EP    1 245 603 A1    10/2002
(Continued)

OTHER PUBLICATIONS

Machine translation of JP 2004-143228 (May 2004, 12 pages).*
(Continued)

*Primary Examiner* — Brieann R Fink
(74) *Attorney, Agent, or Firm* — Timothy D. Meade

(57) ABSTRACT

The invention relates to a waterborne coating composition comprising between 10 and 50% by weight of a water-dispersible and hydrophobic polyester resin, between 50 and 90% by weight of a metal salt of a fatty acid (with the amounts being based on the total solids content in the waterborne coating composition), and a base in an amount of between 70% and 130% of the number of carboxylic acid groups in the resin. It furthermore relates to a process for the preparation of said waterborne coating composition, and to its use.

13 Claims, 1 Drawing Sheet

(56) References Cited

U.S. PATENT DOCUMENTS

| | | | |
|---|---|---|---|
| 4,873,137 A * | 10/1989 | Deyrup | 428/216 |
| 5,281,630 A | 1/1994 | Salsman | |
| 5,599,596 A * | 2/1997 | Sandvick et al. | 428/34.2 |
| 5,858,551 A * | 1/1999 | Salsman | 428/480 |
| 5,958,601 A * | 9/1999 | Salsman | 428/480 |
| 6,291,075 B1 * | 9/2001 | Zhang et al. | 428/452 |
| 6,358,660 B1 * | 3/2002 | Agler et al. | 430/125.32 |
| 6,506,527 B1 * | 1/2003 | Demejo et al. | 430/14 |
| 7,198,696 B2 * | 4/2007 | Eriksson et al. | 162/198 |
| 8,440,262 B2 * | 5/2013 | Dandenault et al. | 427/288 |
| 2004/0005341 A1 | 1/2004 | Dixit et al. | |
| 2010/0189961 A1 * | 7/2010 | Bugas et al. | 428/182 |
| 2011/0244258 A1 * | 10/2011 | Vonfelden | 428/514 |

FOREIGN PATENT DOCUMENTS

| | | | |
|---|---|---|---|
| JP | 2004143228 A * | 5/2004 | |
| WO | WO 01/14426 A1 | 3/2001 | |
| WO | WO 2008/080906 A1 | 7/2008 | |

OTHER PUBLICATIONS

International Search Report with Written Opinion for PCT/EP2010/057285 dated Jul. 5, 2010.
European Search Report for Application No. EP 09163965 dated Oct. 9, 2009.

* cited by examiner

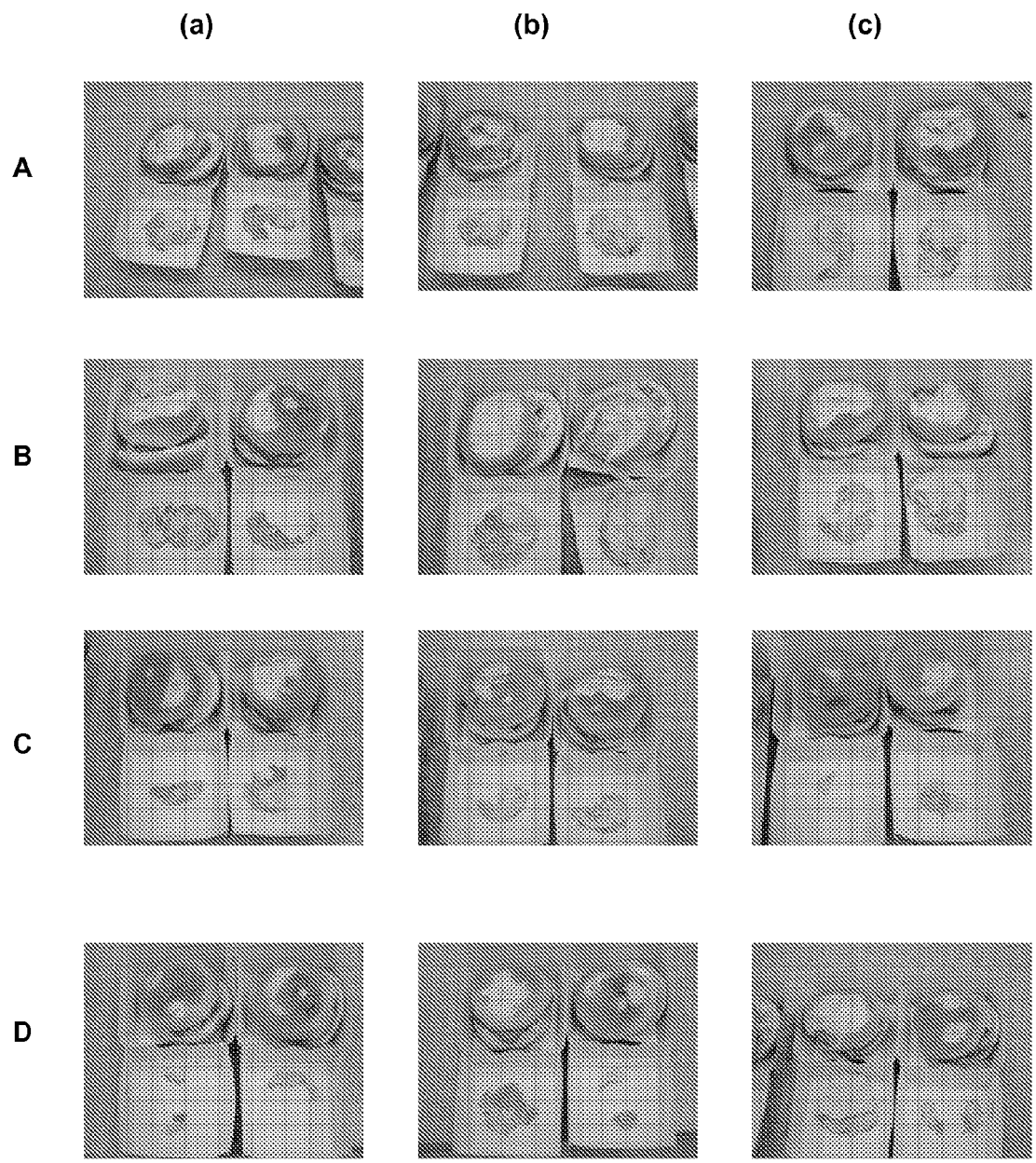

WATERBORNE COATING COMPOSITION COMPRISING A POLYESTER AND A METAL SALT OF A FATTY ACID

This application is a national application of PCT/EP2010/057285 and claims the priority of U.S. 61/183,295 filed on Jun. 2, 2009 and EP 09163965.8 filed on Jun. 29, 2009, the entire contents of each of which are incorporated herein by reference.

The invention relates to a waterborne coating composition comprising a water-soluble or water-dispersible polyester resin and a metal salt of a fatty acid, to a substrate having been coated with said coating composition, and to the use of said coating composition as a coating for paper, cardboard, paperboard, and the like.

Waterborne coatings are often used to provide paper, cardboard or paperboard, used as packaging material for food, with a barrier against water, water vapour, grease, and oil. Typical polymers present in such waterborne coatings include modified styrene-butadienes, acrylates and methacrylates, polyvinyl acetate, polyolefins, and especially hydrophobic polyester resins.

US20040005341 and WO 01/14426 describe coating compositions for paper and paperboard including paper packaging such as that utilized in food wrappers, food containers, food receptacles, etc. comprising a polyvinyl alcohol and a fatty acid melamine wax. Where release properties are desired, a wet-end additive such as EvCote PWR-25, commercially available from AkzoNobel, can be added to the fibers during the paper making process.

EP 0 960 021 describes the excellent water and oil repellency properties of waterborne coating compositions comprising hydrophobic polyester resins prepared from polyethylene terephthalate (PET). The selection of these types of waterborne coating compositions is also advantageous from an environmental point of view, since waste terephthalate polymers such as bottles, sheet material, and textile wastes can be used for the preparation of these resins, and the coatings do not have a negative effect on the compostability of the coated material.

The coated paper, cardboard or paperboard is used for example to pack sausages, fish, pizzas, hotdogs, hamburgers, French fries, and other food items. More particularly, in the fast food industry, all kinds of burger, chicken, and fish sandwiches are packaged in folding cartons, microflute corrugated containers or flexible wraps. After preparation the packaged sandwiches may be stored for short periods of time until the sale transaction occurs. During storage the sandwich bun tends to stick to the carton wall. When the sandwich is removed from the container, the portion of the bun adhered to the carton is stripped off, leaving an unattractive appearance. This effect is particularly noticeable when the sandwich is heated with steam. This effect is also seen in bakeries when dough is baked in forms made of paper, such as muffins and cakes.

Accordingly, there is a need for waterborne coating compositions for paper, cardboard, and paperboard with good release properties and at the same time having good grease resistance properties.

In accordance with the present invention, a waterborne coating composition is provided comprising a specific water-dispersible and hydrophobic polyester resin and a metal salt of a fatty acid. Said water-dispersible and hydrophobic polyester comprises a reaction product of 30 to 70% by weight of a terephthalate polymer, 5 to 40% by weight of a hydroxyl-functional compound having at least two hydroxyl groups, 1 to 20% by weight of a carboxy-functional compound having at least two carboxyl groups, and 10 to 60% by weight of a hydrophobic compound selected from the group consisting of $C_6$-$C_{24}$ straight chain or branched fatty acid or triglycerides thereof, and with the hydroxyl-functional compound being present at 1 to 3 times the equivalent of the hydrophobic moiety. The water-dispersible and hydrophobic resin is present in the waterborne coating composition according to the present invention in an amount of between 10 and 50% by weight (based on the total solids content in the waterborne coating composition). The metal salt of the fatty acid is present in the waterborne coating composition in an amount of between 50 and 90% by weight (based on the total solids content in the waterborne coating composition). Furthermore, a base is present in an amount corresponding to between 70% and 130% of the acid number of the resin.

It was found that when applied to substrates suitable for food packaging (e.g. paper, cardboard, or paperboard), the coated substrate exhibits good release properties, i.e. the food can be easily removed from the substrate, keeping its original appearance. The food has no smell of the coating or packaging material. Furthermore, the coated substrate exhibits good grease-resistant properties.

The coating according to the present invention is a suitable replacement for the undesirable silicon release aids and fluorocarbon grease barrier treatments. Another advantage of the coating compositions according to the present invention is that these formulations do not contain undesirable melamine components often used to cure polyester resins. Furthermore, the coating composition has good W.V.T.R. (water vapour transmission rate, also sometimes denoted as moisture vapour transmission rate, M.V.T.R.).

The water-dispersible and hydrophobic polyester compositions used in accordance with this invention are known (e.g. from EP 960021) to impart desirable water and oil repellency to substrates treated therewith out adversely affecting other desirable properties of the substrate, such as soft hand (or feeling). The water-dispersible resins of the present invention can be synthesized by condensation polymerization with original or recycled PET or polyacid-polyalcohol (multifunctional acids or alcohols) used to make polyesters along with aliphatic acids or hydrogenated or unhydrogenated animal or vegetable triglycerides. The water-dispersible resins are preferably made from waste terephthalate polymers, including bottles, sheet material, textile wastes, and the like. The waste terephthalate plastics may be bought from recyclers and include, but are not limited to, material identified as "PET rock". The waste terephthalate can be characterized by the unit formula

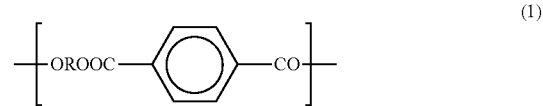

(1)

wherein R is the residue of an aliphatic or cycloaliphatic glycol of 2-10 carbons or of oxygenated glycol of the formula

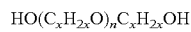

$HO(C_xH_{2x}O)_nC_xH_{2x}OH$ wherein x is an integer from 2-4 and n is 1-10.

Preferably, the waste terephthalate polymer is a polyalkylene terephthalate such as polyethylene terephthalate and polybutylene terephthalate, polycyclohexanedimethanol terephthalate or a mixture thereof. Other suitable polyester polymers which can be used include poly-1,2 and poly-1,3 propylene terephthalate and polyethylene naphthenate. It will be understood that, for reasons of economy, the use of waste terephthalates is preferred. The ionic groups needed for water dispersibility can be a carboxylic acid which is introduced into the resin by polyacid monomers such as trimellitic anhydride, trimellitic acid or maleic anhydride, or sulfonate groups which come from monomers such as dimethyl 5-sulfoisophthalate (DMSIP or dimethyl 5-sulfo, 1,3-benzenedicarboxylate), sulfoisophthalate ethylene glycol (SIPEG or dihydroxyethyl 5-sulfo,3-benzenedicarboxylate, or from sulfonated alkenically unsaturated end groups as described in U.S. Pat. No. 5,281,630. In this respect reference is also made to WO 2008/080906 wherein the grafting of acrylic acid and/or methacrylic acid and/or styrene to alkyd resins is disclosed. The grafts described in this patent may be substituted for the ionic groups to provide the water dispersibility. These grafts can provide other desirable properties as well. The polyacid is preferably selected from the group consisting of isophthalic acid, terephthalic acid, phthalic anhydride (acid), adipic acid, etc. Other unlimitative preferred polyacids are phthalic anhydride (acid), isophthalic and terephthalic acids, adipic acid, fumaric acid, 2,6 naphthalene dicarboxylic acid, and glutaric acid. Mixtures of the above acids and anhydrides can be used as well. The weight percentage of ionic monomers in the resin is from 1% to 20%, but 5 to 10% is preferred. The backbone of the polymer is composed of polyester groups. It can be any linear or branched polyester made using polyacids and polyalcohols. The preferred method is to generate the backbone using polyester from recycled sources. The weight percentage of the polyester backbone ingredients ranges from 30-70% of the whole resin, with 50-60% being most preferred. Such backbone is typically derived from reacting PET such as waste PET with a hydroxy-functional compound containing at least two hydroxyl groups. The hydroxy-functional compound having at least two hydroxy groups is selected from the group consisting of ethylene glycol, diethylene glycol, triethylene glycol, cyclohexanedimethanol, propylene glycol, 1,2-propylene glycol, 1,3-propane diol, 1,2-butylene glycol, 1,3-butanediol, 1,4-butanediol, neopentyl glycol, 1,5-pentanediol, 1,6-hexanediol, glycerol, trimethylolpropane, trimethylolethane, pentaerythritol, erythritol or a monosaccharide. In another embodiment, other hydroxy compounds having at least two hydroxyl groups include derivatives of glycerol, trimethylolpropane, trimethylolethane, pentaerythritol, erythritol or a monosaccharide oxyalkylated with 5-30 moles of ethylene oxide, propylene oxide or a mixture thereof, per hydroxyl of the hydroxy-functional compound. The aliphatic groups consist of 6-24 carbon chain fatty acids or triglycerides thereof such as stearic, oleic, palmitic, lauric, linoleic, linolenic, behenic acid or mixtures thereof. These can come from hydrogenated or unhydrogenated animal or vegetable oil, such as beef tallow, lard, corn oil, soy bean oil, etc., etc. If highly unsaturated fatty acids or triglycerides are used, care must be taken to prevent cross-linking through the unsaturated group. The weight percentage of the aliphatic moiety can be 10-60%, with 20-40% the preferred amount.

There are two basic routes to the manufacture of these resins. These routes are described in EP 960021 but are also outlined below:

Route 1
(1) Aliphatic acids or esters+multifunctional glycol→esterification or transesterification=hydrophobic glycol
(2) Hydrophobic glycol+PET (or diacid with dialcohol)→esterification or transesterification=hydrophobic polyester
(3) Hydrophobic polyester+ionic monomer→esterification or transesterification=water-dispersible and hydrophobic polyester resin Route 2
(1) Diacid or PET+multifunctional glycol→esterification or transesterification=grafting polyester with hydroxyl groups throughout chain and/or as end groups
(2) Grafting polyester+aliphatic acids or esters→esterification or tranesterification=hydrophobic polyester resin
(3) Hydrophobic polyester+ionic monomer→esterification or transesterification=water-dispersible and hydrophobic polyester resin The following steps are used in the process to produce the resin of the present invention:

1. Incorporation of a non-polar group or non-polar groups which can be chosen from the following: fatty acids of the type stearic acid, behenic acid, palmitic acid, lauric acid, oleic acid, linoleic acid, etc.; triglycerides from animal or vegetable sources of the beef tallow, corn oil, soybean oil, peanut oil, safflower oil type, or hydrogenated versions of these, etc.; reactive silicones, blown paraffins or mineral oils, hydrophobic urethanes, etc. This group must be present at 10-60 weight percent.
2. Incorporation by esterification or transesterification of a multifunctional hydroxyl component or components such as pentaerythritol, sorbitol, glycerol, etc. at levels consistent with but not limited to 1 to 3 times the reactive equivalent of the components from group 1.
3. Esterification or transesterification of ingredients typical of those used to make polyester polymers. These ingredients can be chosen from polyethylene terephthalate or similar terephthalates and/or difunctional acids such as terephthalic acid, isophthalic acid, phthalic acid or anhydride combined with difunctional alcohols such as ethylene glycol, diethylene glycol, neopentyl glycol, propylene glycol, etc.
4. Incorporation of an ionic group or groups needed for dispersing the resin in water. Examples of these groups are trimellitic anhydride, maleic anhydride, sulfo succinate, sulfonated isophthalic acid or its esters, etc.
5. Dispersing the resin in water containing an amount of base, if needed, to neutralize the pendant acid groups.

Steps 1-3 can be performed in any order, but the preferred process embodiment order is as listed above.

The polyester resins are usually and preferably made using an ester-interchange catalyst. Suitable catalysts include metal carboxylates and well-known organometallic compounds, particularly compounds of tin or titanium. Preferred catalysts include manganese acetate, sodium acetate, zinc acetate, cobalt acetate or calcium acetate, tetraalkyl titanates, wherein the alkyl is of up to 8 carbon atoms, as well as alkyl stannoic acid or dialkyl tin oxides, such as monobutyl stannoic acid or dialkyl tin oxide. Catalysts which are even more preferred include monobutyl stannoic acid and tetrapropyl or tetrabutyl titanate, or a mixture thereof.

The resulting resinous products obtained are generally taken up in relatively concentrated aqueous solutions of alkali metal or ammonium hydroxides or carbonates. The concentration employed can be determined by routine experimentation.

The resins of the present invention typically have molecular weights in the range of 500 to as high as 50,000. Preferably molecular weights are in the range of 1000 to 10,000. The average molecular weight of the resins is typically determined by GPC or by viscosity measurements or other methods well known in the art of polymer chemistry.

The total amount of water-dispersible and hydrophobic polyester resin in the waterborne coating composition according to the present invention is at least 10% by weight, preferably at least 15% by weight, and most preferably, at least 17% by weight, based on the total solids content in the waterborne coating composition. The total amount of water-dispersible and hydrophobic polyester resin in the waterborne coating composition is at most 50% by weight, preferably at most 45% by weight, and most preferably at most 40% by weight, based on the total solids content in the waterborne coating composition.

The term fatty acid as used throughout the description is meant to denote a carboxylic acid comprising a saturated or unsaturated carbon chain containing 8 to 24 carbon atoms, preferably containing 10 to 22 carbon atoms, and most preferably containing 12 to 20 carbon atoms. Suitable examples include myristic acid, stearic acid, behenic acid, arachidonic acid, palmitic acid, and lauric acid. The fatty acid is present in the waterborne coating composition in the form of a metal salt. The metal is preferably selected from the group consisting of calcium, magnesium, zinc, aluminium, and zirconium.

The total amount of the metal salt of the fatty acid in the waterborne coating composition is at most 90% by weight, preferably at most 85% by weight, based on the total solids content in the waterborne coating composition. The total amount of metal salt of a fatty acid in the waterborne coating composition is at least 50% by weight, based on the total solids content in the waterborne coating composition.

It is noted that depending on the application, the relative amounts of water-dispersible and hydrophobic polyester resin and metal salt of the fatty acid may be varied. For instance, it may be preferred to add relatively high amounts of a metal salt of a fatty acid if it is important to have a coating with excellent release properties (e.g. when used as a coating for packaging materials for steamed sandwiches). If it is important to have sufficient grease resistance, it may be preferred to add relatively low amounts of a metal salt of a fatty acid (e.g. when used as a coating for forms made of paper for bakeries).

The waterborne coating composition according to the present invention can be prepared by making a colloidal solution or a dispersion of the water-dispersible and hydrophobic polyester resin according to the present invention in water, a base being present in an amount corresponding to between 70% and 130% of the acid number of the resin, and adding a metal salt of a fatty acid, such that the water-dispersible and hydrophobic polyester resin is present in an amount of between 10 and 50% by weight and the metal salt of a fatty acid is present in an amount of between 50 and 90% by weight, with the amounts being based on the total solids content in the waterborne coating composition. By "a base being present in an amount corresponding to between 70% and 130% of the acid number of the resin" is meant that a base is present in an amount of between 70% and 130% of the number of carboxylic acid functionalities in the resin. The metal salt of a fatty acid is preferably added in situ in dispersed, pre-dispersed or solid form.

The base can be any base conventionally used in this type of coating composition. However, if the waterborne coating composition is used for food grade applications, food approved bases are used. Most preferably, ammonia is used as the base. As described, the base is used in an amount of between 70% and 130% of the amount which corresponds to a stoichiometric amount according to the acid number of the resin. Preferably, it is used in an amount of between 85 and 115% of the stoichiometric amount. Most preferably, a stoichiometric amount is used.

In addition to the polyester resin and the metal salt of the fatty acid, the waterborne coating composition according to the present invention may contain conventional components such as for example emulsifiers, pigments and (functional) fillers, dispersants, protective colloids, volatile solvents, pH buffers, thickeners, wetting agents, antifoaming agents, colorants, and crosslinkers. Examples of suitable crosslinkers include zinc oxide, zirconium ammonium carbonate, urea melamine, a urea formaldehyde resin, and glyoxal (melamine) resins. Examples of the functional fillers would be platy talc, platy clay, mica, exfoliated hydrotalcite or bentonite.

The waterborne coating composition may be pH-sensitive. When the pH drops below 6.5, it may become unstable and gel formation may occur. Hence, the preferred pH range is between 7.0 and 12 (more preferably, between 8.5 and 10). Conventional buffers may be added to control the pH.

A potential drawback of working in the above-mentioned preferred pH-range is that the composition has a tendency to foam under application conditions, which negatively impacts runnability and coating performance. In one embodiment of the invention, foaming can be reduced by the addition of volatile solvents such as isopropanol. These solvents are preferably used in an amount of 1,5 to 4% by weight based on the total weight of the waterborne coating composition. Alternatively, commercially available defoamers can be added such as the defoamer Paracum D44/PDI of Dr. W. Kolb A.G. in Hedingen/Switzerland. This particular defoamer was found to be very efficient at an addition level of 0.3 to 1%. This defoamer is a fatty acid ester of alkoxylated alcohols.

Surprisingly, the addition of talc or other cationically charged minerals like hydrotalcite to the waterborne coating composition was found to be very effective at inhibiting foam formation even under high agitation and conditions that would promote air entrainment. The addition level of the above additives to the waterborne coating composition preferably is between 5 to 45% by weight of the metal salt of the fatty acid.

Substrates which are suitable for being coated with the waterborne coating composition according to the invention include wrapping paper, fine paper, parchment paper, paperboard, full carton, cardboard, and corrugated cardboard. The substrates can be in the form of a food container, clam shell, food receptacle, food tray, food wrapper, etc. They are preferably used in the fast food industry for packaging and storage of fast food items such as sausages, fish, pizzas, hotdogs, hamburgers, French fries, fried chicken, sandwiches, and the like, or as ovenable paperboard suitable for use in baking applications.

The coating compositions according to the invention can be applied to a substrate in any conventional manner, e.g., by means of rolling, spraying, brushing, sprinkling, doctor blade or rod coating application, flow coating, curtain coating, dipping, air-atomized spraying, air-assisted spraying, airless spraying, high volume low pressure spraying, air-assisted airless spraying, or by a printing technology such as flexo, litho, gravure or offset printing.

The present invention is elucidated by means of the following non-limiting Examples.

COMPARATIVE EXAMPLES A-D

Bun Stick Tests

Uncoated clam shells were coated on lab scale with the following waterborne coating compositions (6 g/m² wet coat weight):
A. EvCote® PWR-25
B. EvCote® PWR-25+25% ammonium stearate C. EvCote® PWR-25+5% calcium stearate (50% dry substance)

D. EvCote® PWR-25+2% Wacker E10 (silicon oil 35% dry substance)

EvCote® PWR-25 is the ammonium salt of a stearic acid-modified PET (polyethylene terephthalate) and commercially available from AkzoNobel. Calcium stearate is also commercially available from AkzoNobel. Wacker E10 was obtained from Wacker Chemie AG in Burghausen/Germany. Ammonium stearate (CAS1002-89-7) can for example be obtained from Kemco International.

The coated clam shells sheets were folded into shape and glued together by hand to form the fish packages.

The following test procedure was followed:
1. Frozen fish filets were fried for 3 minutes, 15 seconds at 180° C. and kept warm at 95° C. until used.
2. Buns were steamed in a conventional bun steamer in order to appear fresh.
3. The top half of the bun was placed in the top of the box with the outer side downwards.
4. On the cut side tartar sauce was added.
5. The fish was put on the tartar sauce.
6. A slice of cheese was put on the fish.
7. The bottom half of the bun was placed on the top of the cheese.
8. The box was closed and turned downside up and put in the warming unit at 62° C.
9. The thus prepared clam shells were inspected after 10, 15, and 20 minutes. Photographs were taken after 10 min (see FIG. 1(a)), after 15 min (see FIG. 1(b)), and after 20 min (see FIG. 1(c)).
10. After the expired time the clam shell was opened. The fish sandwich had no smell of the coating or board.
11. The sandwich was taken out of the shell and it was determined whether the bun stuck to the board of the clam shell.

In all four Comparative Examples the tops of the buns stuck seriously to the tops of the coated boxes, leaving a bun with an unattractive appearance (see FIG. 1).

Examples 1 and 2 and Comparative Examples E-F

Bun Stick Tests

Uncoated boxes for fish sandwiches were coated on lab scale with the following waterborne coating compositions (2-10 g/m² wet coat weight):

| Example | Amount of EvCote ® PWR-25 [% dry] | Amount of calcium stearate [% dry] | Number in box |
|---|---|---|---|
| E | 43 | 57 | 2 |
| 1 | 33 | 67 | 3 |
| 2 | 25 | 75 | 4 |
| 3 | 18 | 82 | 5 |
| 4 | 11 | 89 | 6 |
| F | 0 | 100 | 7 |

Two standard procedures were tested,
2 fish sandwiches were steamed together for 12 seconds. The top of the bun was placed in the box and then tartar sauce, fish, cheese, and the bottom of the bun were applied and the box was closed and kept warm (62° C.) for 10 minutes.
4 sandwiches were steamed together for 30 seconds. The top of the bun was placed in the box and then sauce, fish, cheese, and the bottom of the bun were applied and the box was closed and kept warm (62° C.) for 10 minutes.

The boxes were inspected after steaming for 12 seconds and after steaming for 30 seconds.

The coated box according to Comparative Example E showed some bun stick on the bottom of the fish sandwich and the top of the bun had a crack due to sticking.

The coated boxes according to Examples 1 and 2 only showed some minor bun stick on the bottom of the fish sandwich. The top of the buns were unchanged.

The coated box according to Example 3 did not show any bun stick and no grease spots were observed.

The coated box according to Example 4 had no bun stick, but some grease spots were observed.

The coated box according to Comparative Example F showed no bun stick, but there were too many grease spots to be acceptable.

Example 5

3M® Kit Test

The 3M® Kit test was developed by 3M® to simulate fat and oil penetration through paper or board which was treated with fluorochemicals (FC). Fluorochemicals are applied to paper to reduce penetration by fats and oils. Fluorochemicals do not create a continuous film; rather, they rely upon differences in surface tension to prevent penetration by grease and oil. When the surface tension of the liquid is higher than the surface tension of the substrate, the liquid will not penetrate the substrate but remain as a droplet on the surface. FC treated paper may reach a surface tension of 18 dynes/cm or lower.

With barrier coatings, the surface tension of the surface coating may be higher than the surface tension of FC treated board. However, the formation of an uninterrupted film and maintaining a minimum coating thickness across the surface of the substrate are important contributors to the barrier performance. Pin holes and diffusion through thin spots in the coating (which arise due to the surface roughness of the substrate or non-uniform application of the coating) contribute to reduction of the oil and grease performance of a coating For this example the waterborne coating composition according to Example 3 was used, i.e. a waterborne coating composition prepared from 30% of EvCote® PWR-25 (20% solids) and 70% of calcium stearate (50% solids). This waterborne coating composition was applied at a flexographic printing press and a lithographic printing press in one pass and two passes. As measurement for grease hold-out the Kit test was performed.

For this test, a series of solutions were prepared by mixing specific concentrations of castor oil, toluene, and n-heptane. Each specific solution has a specified Kit value. Higher Kit values imply greater grease and oil barrier properties. The grease and oil barrier performance is measured by applying a drop of a specific Kit solution to a substrate with a pipette. After 15 seconds the presence of any darkened spots within the area where the liquid was applied indicates penetration of the substrate by the liquid. Penetration indicates failure of the test, and the Kit value is less than that of the specific solution that was applied. The test is repeated with lower Kit solutions until no penetration is observed. The solution with the highest Kit value which does not exhibit any darkening of the substrate is defined as the Kit value of substrate. The testing can be conducted in inverse fashion starting with lower Kit solutions and moving to higher Kit solutions until the failure point is determined. The test liquid penetration is determined in part by the surface tension of the surface of the substrate. The grease and oil barrier performance may also be determine by the impermeability of a surface coating.

The table below shows the composition of the test liquids and the corresponding surface tension.

| Kit # | Castor Oil % vol. | Toluene % vol. | n-Heptane % vol. | SurfaceTension dynes/cm |
|---|---|---|---|---|
| 1 | 100 | 0 | 0 | 33.9 |
| 2 | 90 | 5 | 5 | 31.2 |
| 3 | 80 | 10 | 10 | 28.8 |
| 4 | 70 | 15 | 15 | 27.6 |
| 5 | 60 | 20 | 20 | 26.3 |
| 6 | 50 | 25 | 25 | 25.3 |
| 7 | 40 | 30 | 30 | 24.8 |
| 8 | 30 | 35 | 35 | 24.4 |
| 9 | 20 | 40 | 40 | 24.3 |
| 10 | 10 | 45 | 45 | 24 |
| 11 | 0 | 50 | 50 | 23.8 |
| 12 | 0 | 45 | 55 | 23.4 |

Results of Kit measurements with the waterborne coating composition according to Example 4 showed that a sufficient Kit level of 4 to 5 can be accomplished with either one or two printing layers.

Paper printed with one or two coating layers of a formulation containing on a solids basis 62.2% Calcium Stearate, 15.5% EvCote PWRH-NT, 20.2% talc (Jetfine 8CF—available from Rio Tinto Minerals), and 2.2% of Bodoxin AE (a commercial biocide) was evaluated for grease resistance. Similarly paper printed with one or two coating layers of a formulation containing on a solids basis 78.2% calcium Stearate, 17.2% EvCote PWRH-NT, 2.3% of Bodoxin AE (a commercial biocide), and 2.3% of Paracum 44 PDI (a commercial defoamer) was evaluated for grease resistance. In all cases, Kit values of 4 and 5 were observed. When tested with hot fries the talc container material showed slightly reduced grease resistance but still within the acceptable level. However, the talc containing variant did not exhibit foaming during application on the commercial printing equipment. Significant foaming was observed with the non-talc variant during testing on commercial printing equipment. Foaming was significant enough to adversely affect runability of the product. cm The invention claimed is:

The invention claimed is:

1. A waterborne coating composition comprising
   (a) between 10 and 50% by weight of a water-dispersible and hydrophobic polyester resin comprising a reaction product of 30 to 70% by weight of a terephthalate polymer, 5 to 40% by weight of a hydroxyl-functional compound having at least two hydroxyl groups, 1 to 20% by weight of a carboxy-functional compound having at least two carboxyl groups, and 10 to 60% by weight of a hydrophobic compound selected from the group consisting of $C_6$-$C_{24}$ straight chain or branched fatty acid or triglycerides thereof, and with the hydroxyl-functional compound being present at 1 to 3 times the equivalent of the hydrophobic moiety,
   (b) between 50 and 90% by weight of a metal salt of a fatty acid, with the amounts being based on the total solids content in the waterborne coating composition, and
   (c) a base in an amount of between 70% and 130% of the number of carboxylic acid groups in the resin.

2. The waterborne coating composition according to claim 1 wherein the polyester resin is a water-dispersible and hydrophobic polyester resin comprising the reaction product of waste terephthalate of the unit formula

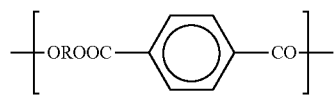

(1)

wherein R is the residue of an aliphatic or cycloaliphatic glycol of 2-10 carbons or of oxygenated glycol of the formula $HO(C_xH_{2x}O)_nC_xH_{2x}OH$ wherein x is an integer from 2-4 and n is 1-10.

3. The waterborne coating composition according to claim 1 wherein the fatty acid of the metal salt of the fatty acid is selected from the group consisting of myristic acid, stearic acid, behenic acid, arachidonic acid, palmitic acid, and lauric acid.

4. The waterborne coating composition according to claim 1 wherein the metal is selected from the group consisting of calcium, magnesium, zinc, aluminium, and zirconium.

5. The waterborne coating composition according to claim 1 wherein talc or another cationically charged mineral is present in an amount of between 10 to 45% of the metal salt of the fatty acid.

6. A process for the preparation of the waterborne coating composition according to claim 1 comprising the steps of
   preparing a colloidal solution or a dispersion of a water-dispersible and hydrophobic polyester resin comprising a reaction product of 30 to 70% by weight of a terephthalate polymer, 5 to 40% by weight of a hydroxyl-functional compound having at least two hydroxyl groups, 1 to 20% by weight of a carboxy-functional compound having at least two carboxyl groups, and 10 to 60% by weight of a hydrophobic compound selected from the group consisting of $C_6$-$C_{24}$ straight chain or branched fatty acid or triglycerides thereof, and with the hydroxyl-functional compound being present at 1 to 3 times the equivalent of the hydrophobic moiety, in water, a base being present in an amount corresponding to between 70% and 130% of the acid number of the resin, and
   adding a metal salt of a fatty acid,
   such that the water-dispersible and hydrophobic polyester resin is present in an amount of between 10 and 50% by weight and the metal salt of a fatty acid is present in an amount of between 50 and 90% by weight, with the amounts being based on the total solids content in the waterborne coating composition.

7. A process for coating a substrate with the coating composition according to claim 1 wherein the substrate is for food packaging and is selected from the group consisting of paper; paperboard; full carton; cardboard; and corrugated cardboard.

8. A process for coating a substrate with the coating composition according to claim 1 wherein the substrate is selected from the group consisting of a food-container, clam shell, food receptacle, food tray, and a food wrapper.

9. A substrate coated with a coating composition according to claim 1 wherein the substrate is paper; paperboard, full carton; cardboard; or corrugated board.

10. A substrate coated with a coating composition according to claim 1 wherein the substrate is selected from the group consisting of a food-container, clam shell, food receptacle, food tray, and a food wrapper.

11. The process according to claim 7 wherein the paper is wrapping paper, fine paper or parchment paper.

12. The substrate according to claim 9 wherein the paper is wrapping paper, fine paper or parchment paper.

13. The waterborne coating composition according to claim 5 wherein the talc or another cationically charged mineral comprises hydrotalcite.

* * * * *